United States Patent
Peppler

(10) Patent No.: US 7,364,198 B2
(45) Date of Patent: Apr. 29, 2008

(54) STEERING COLUMN LOCKING MECHANISM

(75) Inventor: Steven A. Peppler, Indianapolis, IN (US)

(73) Assignee: TRW Automotive U.S. LLC, Livonia, MI (US)

(*) Notice: Subject to any disclaimer, the term of this patent is extended or adjusted under 35 U.S.C. 154(b) by 337 days.

(21) Appl. No.: 10/971,313

(22) Filed: Oct. 22, 2004

(65) Prior Publication Data

US 2006/0097500 A1    May 11, 2006

(51) Int. Cl.
B62D 1/18    (2006.01)

(52) U.S. Cl. .................................. 280/775; 74/493
(58) Field of Classification Search ............... 280/775, 280/779; 74/492, 493; 91/417 R
See application file for complete search history.

(56) References Cited

U.S. PATENT DOCUMENTS

| | | | | |
|---|---|---|---|---|
| 1,643,588 A | * | 9/1927 | Ratigan | .................... 267/70 |
| 3,171,329 A | * | 3/1965 | Rasmussen | .................. 91/365 |
| 5,421,294 A | * | 6/1995 | Ruoff et al. | ............. 123/90.17 |
| 6,514,001 B1 | * | 2/2003 | Yezersky et al. | ........ 403/109.1 |
| 6,666,478 B2 | | 12/2003 | Livengood | |
| 6,830,267 B2 | * | 12/2004 | Budaker et al. | ............ 280/775 |
| 7,165,786 B1 | * | 1/2007 | Sha et al. | .................. 280/775 |
| 7,174,804 B2 | * | 2/2007 | Adoline et al. | ............... 74/493 |
| 2003/0227159 A1 | * | 12/2003 | Muller | ........................ 280/731 |

* cited by examiner

Primary Examiner—Eric Culbreth
Assistant Examiner—Joseph Rocca
(74) Attorney, Agent, or Firm—Tarolli, Sundheim. Covell & Tummino LLP

(57) ABSTRACT

A steering column locking mechanism 130 includes a piston 176 located in a chamber in a housing 178. The locking mechanism 130 is in an engaged condition locking the steering column 10 against movement relative to a frame of a vehicle when the piston 176 is in a first position (FIG. 2). The locking mechanism 130 is in a disengaged condition in which the locking mechanism is ineffective to lock the steering column 10 when the piston is in a second position (FIG. 3). The first pressure is continuously applied to a relatively small area on a first side 256 of the piston 176 to retain the piston in the first position and to retain the locking mechanism 130 in the engaged condition. Pressure is applied to a relatively large area on a second side 272 of the piston 176 to move the piston from the first position to the second position against the influence of the first pressure.

16 Claims, 3 Drawing Sheets

STEERING COLUMN LOCKING MECHANISM

FIELD OF THE INVENTION

The present invention relates to a steering column, and more specifically, to a locking mechanism for an adjustable steering column.

BACKGROUND OF THE INVENTION

A known steering column is disclosed in U.S. Pat. No. 6,666,478. This patent discloses a locking mechanism which is operable between engaged and disengaged conditions. When the locking mechanism is in an engaged condition, it is effective to hold the steering column against movement relative to a frame of a vehicle. When the locking mechanism is in a disengaged condition, it is ineffective to lock the steering column against movement relative to the frame of a vehicle.

This known locking mechanism includes a cylinder which receives pressurized fluid. When the locking mechanism is to be operated to the engaged condition, a first valve is actuated to direct high pressure fluid to a first chamber on one side of a piston. At the same time, a second valve is operated to exhaust the fluid pressure in a second chamber on the opposite side of the piston. When this known locking mechanism is to be operated from the engaged condition to the disengaged condition, the first valve is operated to vent the first chamber. At the same time, the second valve is operated to direct high pressure fluid to the second chamber.

SUMMARY OF THE INVENTION

The present invention provides a simplified valving arrangement for use in association with a locking mechanism for an adjustable vehicle steering column. The locking mechanism includes a first apparatus which is operable to continuously apply first pressure to a first side of a piston. This first pressure is effective to retain the piston in a position in which the locking mechanism is in an engaged condition. A second apparatus is operable to apply a second pressure to a second side of the piston. The second pressure is effective to move the piston to a position in which the locking mechanism is in a disengaged condition.

Although the piston may have any one of many different constructions, the piston advantageously has a surface area on one side of the piston which is larger than a surface area on the opposite side of the piston. Therefore, when fluid pressure is applied to the relatively large surface area on the one side of the piston, the piston is moved against fluid pressure applied to the relatively small surface area on the opposite side of the piston.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF ONE SPECIFIC PREFERRED EMBODIMENT OF THE INVENTION

Figure 1:
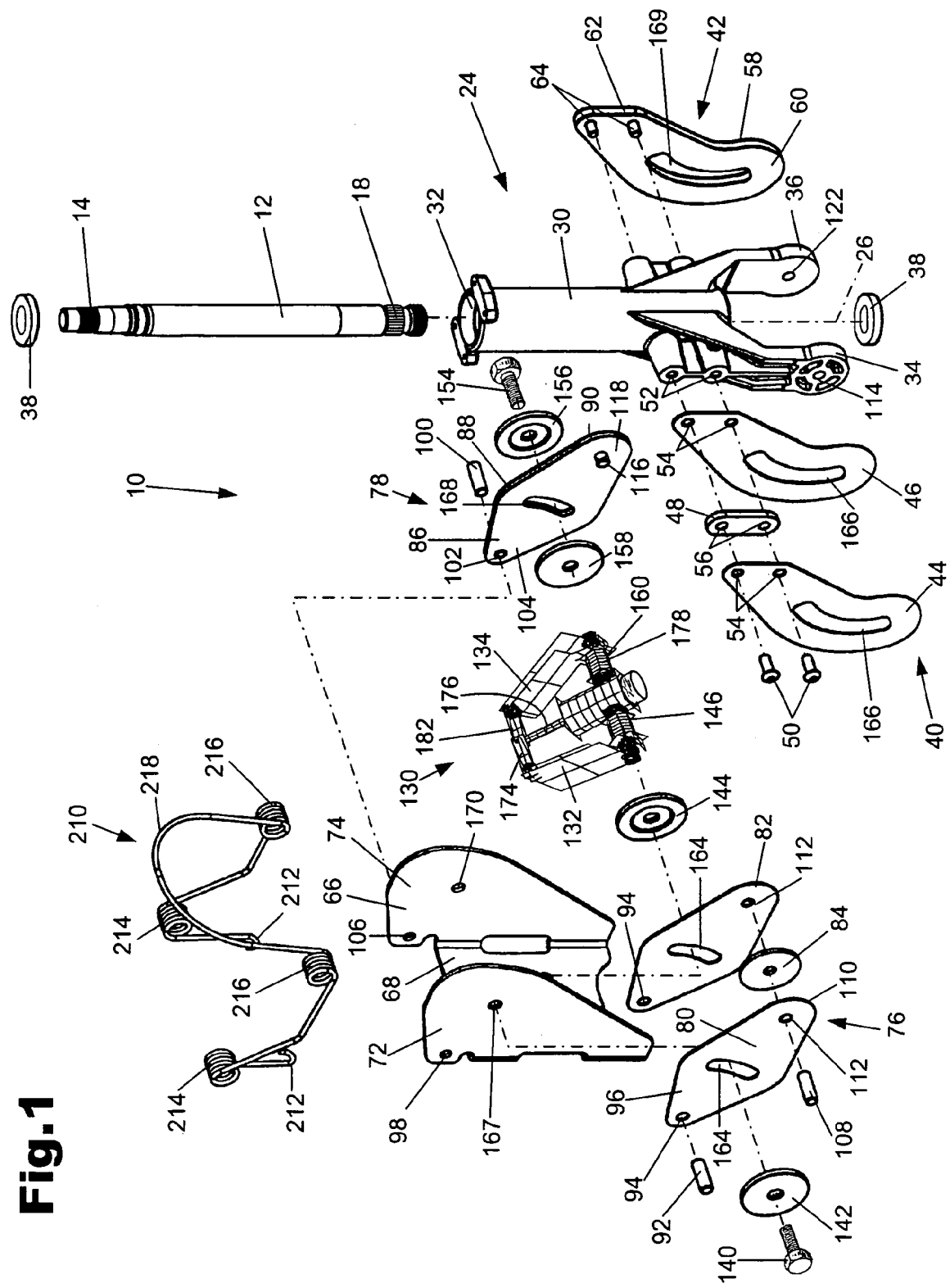
FIG. 1 is an exploded view of an adjustable steering column constructed in accordance with the present invention.
Figure 2:
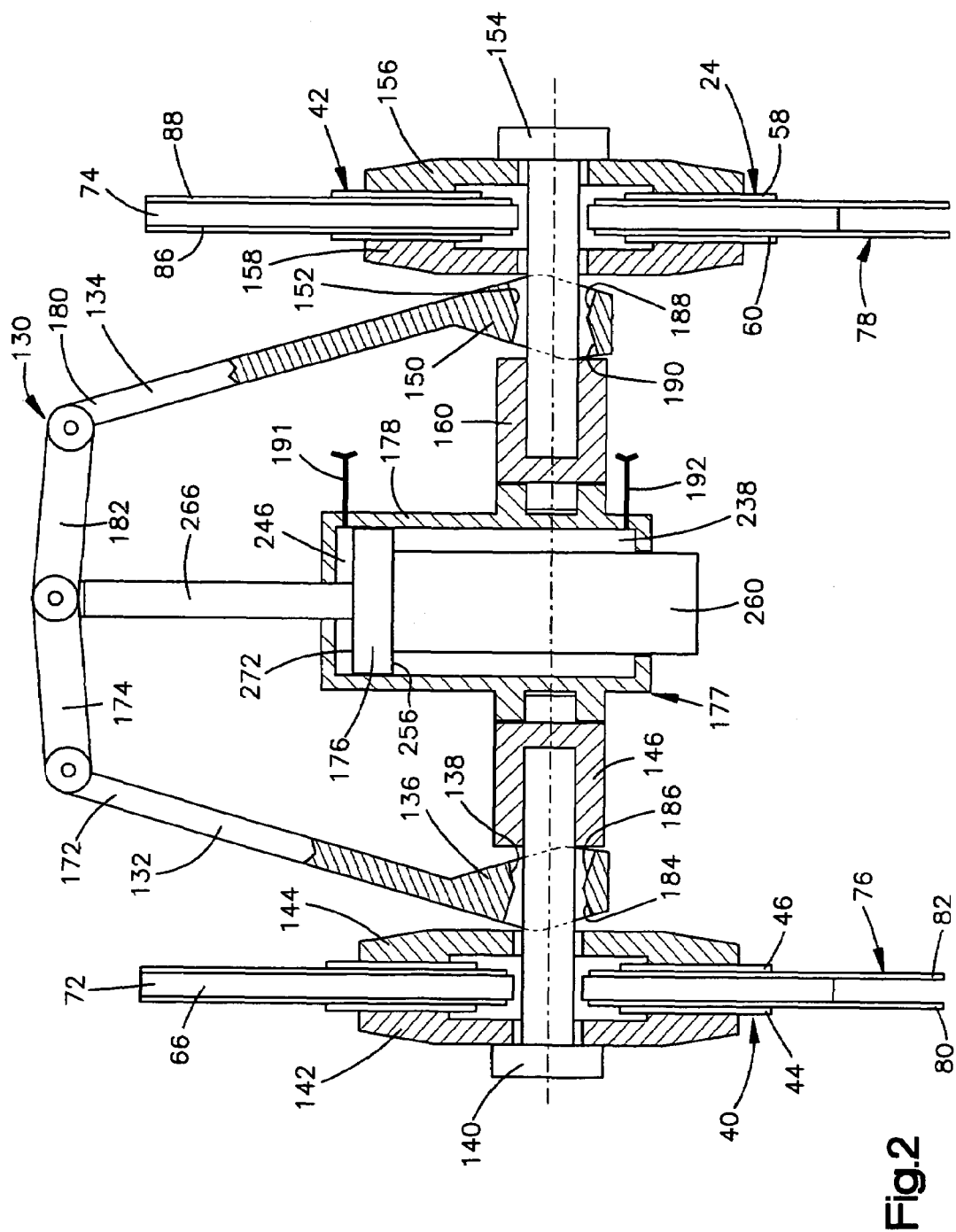
FIG. 2 is a schematic cross-sectional view of a locking mechanism for the adjustable steering column of FIG. 1.

A vehicle steering column 10 constructed according to the present invention is illustrated in FIGS. 1 and 2. The steering column 10 (FIG. 1) includes a rotatable steering column member 12 to turn steerable vehicle wheels (not shown). The steering column member 12 has an end 14 connectable with a steering wheel (not shown) in manner known in the art.

An end 18 of the steering column member 12 opposite from the end 14 is connectable with a universal joint (not shown). The universal joint connected with the end 18 of the steering column member 12 is connectable with a mechanism designed to transmit movement of the steering column member to a steering gear and permit movement of the steering column member relative to the mechanism, as known in the art.

A support 24 supports the steering column member 12 for rotation about a longitudinal axis 26 of the steering column member. Upon rotation of the steering wheel, the steering column member 12 rotates about the longitudinal axis 26. Upon rotation of the steering column member 12 about the longitudinal axis 26, steerable vehicle wheels (not shown) are turned, as known in the art.

The support 24 has a tubular portion 30 with a passage 32 through which the steering column member 12 extends. Arm portions 34 and 36 extend axially from the tubular portion 30. The tubular portion 30 is made by casting and may have any desired shape. Bearings 38 located in the passage 32 support the steering column member 12 for rotation about the axis 26 relative to the support 24.

The support 24 includes locking portions 40 and 42 extending from opposite sides of the tubular portion 30. The locking portion 40 includes plates 44 and 46 fixedly connected to each other with a spacer 48 between them. The locking portion 40 is fixedly connected to the tubular potion 30 by fasteners 50, such as screws. The fasteners 50 threadably engage openings 52 in the tubular portion 30 and extend through openings 54 in the plates 44 and 46 and through openings 56 in the spacer 48.

The locking portion 42 is identical to locking portion 40 and, therefore, will not be described in detail. The locking portion 42 includes plates 58 and 60 fixedly connected to each other with a spacer 62 between them. The locking portion 42 is fixedly connected to the tubular potion 30 by fasteners 64, such as screws. The fasteners 64 threadably engage openings in the tubular portion 30 and extend through openings in the plates 58 and 60 (FIGS. 1 and 2) and through openings in the spacer 62.

A mounting bracket 66 (FIG. 1) connects the steering column 10 with a vehicle frame. The mounting bracket 66 has a rear wall 68 with openings for receiving fasteners to connect the mounting bracket to the vehicle frame. The mounting bracket 66 is connected to the vehicle frame using fasteners, such as bolts, as known in the art.

A pair of side walls or side portions 72 and 74 extend from the rear wall 68 of the mounting bracket 66. The side walls 72 and 74 extend generally perpendicular to the rear wall 68 and parallel to each other. A pair of identical arms 76 and 78 interconnect the support 24 and the mounting bracket 66. The arm 76 includes a pair of plates 80 and 82 fixedly connected together with a washer 84 between them. The side wall 72 of the mounting bracket 66 extends between the plates 80 and 82. The arm 78 includes a pair of plates 86 and 88 (FIG. 2) fixedly connected together with a washer 90 (FIG. 1) between them. The side wall 74 of the mounting bracket 66 extends between the plates 86 and 88.

A pin 92 (FIG. 1) extends through openings 94 in an end 96 of the arm 76. The pin 92 is received in an opening 98 in the side wall 72 to pivotally connect the arm 76 to the side wall 72. A pin 100 extends through openings 102 in an end 104 of the arm 78. The pin 100 is received in an opening 106 in the side wall 74 to pivotally connect the arm 78 to the side wall 74. Accordingly, the arms 76 and 78 can pivot relative to the mounting bracket 66.

A pin 108 pivotally connects an end 110 of the arm 76 to the support 24. The pin 108 extends through openings 112 in the end 110 and the washer 84 and into an opening 114 in the arm portion 34 of the support 24. A pin 116 pivotally connects an end 118 of the arm 78 with the arm portion 36 of the support 24. The pin 116 extends through openings in the end 118 and the washer 90 and into an opening 122 in the support 24. Accordingly, the support 24 can pivot relative to the arms 76 and 78.

An over-center locking mechanism 130 locks the arms 76 and 78 in any one of a plurality of pivot positions relative to the mounting bracket 66. The locking mechanism 130 also locks the support 24 in any one of a plurality of pivot positions relative to the arms 76 and 78. The locking mechanism 130 applies a force to clamp the arm 76 and the side wall 72 of the mounting bracket 66 between the plates 44 and 46 of the locking portion 40 of the support 24. The locking mechanism 130 clamps the arm 78 and the side wall 74 of the mounting bracket 66 between the plates 58 and 60 of the locking portion 42 of the support 24.

The over-center locking mechanism 130 (FIGS. 1 and 2) includes locking members 132 and 134 that apply a force to the plates 46 and 60 of the locking portions 40 and 42 of the support 24 when the locking members are in first or locking positions. The locking member 132 (FIG. 2) has an end 136 with an opening 138 through which a locking shaft or bolt 140 extends. The bolt 140 also extends through washers 142 and 144. The washer 144 is located between the end 136 and the plate 46 of the support 24. The bolt 140 threadably engages a cylindrical member 146 (FIGS. 1 and 2). The locking lever 134 (FIG. 2) has an end 150 with an opening 152 through which a locking shaft or bolt 154 extends. The bolt 154 also extends through washers 156 and 158. The washer 158 is located between the end 150 and the plate 60 of the support 24. The bolt 154 threadably engages a cylindrical member 160 (FIGS. 1 and 2).

The bolt 140 (FIG. 1) extends through arcuate slots 164 in the arm 76 and arcuate slots 166 in the locking portion 40 of the support 24. The arcuate slots 164 in the arm 76 are located between the ends 96 and 110 of the arm 76. The bolt 140 also extends through opening 167 in the side wall 72 of the mounting bracket 66. The bolt 154 extends through arcuate slots 168 in the arm 78 and arcuate slots 169 in the locking portion 42 of the support 24. The bolt 154 also extends through opening 170 in the side wall 74 of the mounting bracket 66.

The locking member 132 (FIG. 2) has an end 172 pivotally connected with an actuation lever 174 that transfers force to the locking member 132. The actuation lever 174 is pivotally connected with a cylindrical piston 176 of a moving mechanism or linear actuator 177 in the locking mechanism 130. The piston 176 is disposed in a cylindrical chamber in a cylindrical housing 178.

The locking member 134 has an end 180 pivotally connected with an actuation lever 182 that transfers force to the locking member 134. The actuation lever 182 is pivotally connected with the linear actuator 177. Accordingly, when the linear actuator 177 is operated, the actuator levers 174 and 182 pivot and the locking members 132 and 134 pivot relative to the actuation levers.

The opening 138 (FIG. 2) in the end 136 of the locking member 132 has tapered axial ends 184 and 186 to permit movement of the locking member 132 relative to the bolt 140. The end 136 has a first dimension extending between the cylindrical member 146 and the washer 144 when the locking member 132 is in the first or locking position, as shown in FIG. 2. The end 136 urges the cylindrical member 146 and the washer 144 away from each other when in the locking position. The end 136 has a second dimension smaller than the first dimension that extends between the cylindrical member 146 and the washer 144 when the locking member 132 is in a second or release position.

The opening 152 in the end 150 of the locking member 134 has tapered axial ends 188 and 190 to permit movement of the locking member 134 relative to the bolt 154. The end 150 has a first dimension extending between the cylindrical member 160 and the washer 158 when the locking member 134 is in the first or locking position, as shown in FIG. 2. The end 150 urges the cylindrical member 160 and the washer 158 away from each other when in the locking position. The end 150 has a second dimension smaller than the first dimension extending between the cylindrical member 160 and the washer 158 when the locking member 134 is in a second or release position. When the locking members 132 and 134 are in the second positions, the support 24 can be moved relative to the mounting bracket 66.

A spring member 210 (FIG. 1) urges the support 24 to pivot in a counterclockwise direction, as viewed in FIG. 1, relative to the arms 76 and 78 and the arms to pivot in a counterclockwise direction relative to the mounting bracket 66. The spring member 210 has ends 212 that engage the mounting bracket 66 to connect the spring member to the mounting bracket. Coiled portions 214 of the spring member 210 extend around and engage the pins 92 and 100. Coiled portions 216 extend around and engage the pins 108 and 116. A curved portion 218 of the spring member 210 extends between the coiled portions 216 and engages the support 24. The spring member 210 urges the support 24 into an out of the way position. Although the spring member 210 is shown as having coiled portions 214 and 216 and curved portion 218, it is contemplated that any mechanism may be used to urge the support 24 to the out of the way position. It is also contemplated that the support 24 may not be urged to the out of the way position.

In accordance with one of the features of the present invention, a simplified control apparatus 230 (FIG. 3) is provided in the steering column locking mechanism 130 in association with the linear actuator 177. The control apparatus 230 includes a source 232 of fluid pressure. In the embodiment of the invention illustrated schematically in FIG. 3, the source 232 of fluid pressure includes a pump 234 which supplies fluid under pressure to an accumulator 236. Of course, other known fluid pressure sources may be utilized if desired.

The source 232 of fluid pressure is continuously connected with a cylindrical variable volume lower chamber 238 in a cylinder 240 of the linear actuator 177 by a conduit 242. The conduit 242 extends directly from the accumulator 236 to the lower chamber 238 of the linear actuator 177. The conduit 242 is not connected with a flow control valve which is operable between a closed position blocking fluid flow and an open position enabling fluid flow. Therefore, the lower chamber 238 of the linear actuator 177 is continuously connected in fluid communication with the source 232 of fluid pressure. However, if desired, a valve, such as pressure reducing valve and/or a shut-off valve, may be provided in association with the conduit 242.

Similarly, the accumulator 236 is connected with a cylindrical variable volume upper chamber 246 in the cylinder 240 by a conduit 248 and a flow control valve 250. The flow control valve 250 is operable between an actuated condition (FIG. 3) and an unactuated condition by a solenoid 251. When the flow control valve 250 is in the actuated condition, fluid can flow from the source 232 of fluid pressure through a valve passage 252 to the upper chamber 246 in the cylinder 240. When the valve 250 is in the unactuated condition, fluid flow from the source 232 of fluid pressure is blocked and the upper chamber 246 in the cylinder 240 is vented to atmosphere or a suitable reservoir through a valve passage 254. The fluid pressure conducted from the source 232 of fluid pressure to the upper chamber 246 is equal to the fluid pressure conducted from the source 232 of fluid pressure to the lower chamber 238.

If desired, valves in addition to the flow control valve 250 may be associated with the conduit 248. For example, a pressure reduction valve and/or shut-off valve may be provided in association with the conduit 248.

In accordance with another one of the features of the present invention, the piston 176 has a relatively small lower side surface 256 which is exposed to the fluid pressure in the lower chamber 238. The lower side surface 256 has an annular configuration and extends around a cylindrical lower piston rod 260. The lower piston rod 260 is disposed in a coaxial relationship with the cylindrical piston 176 and extends into an opening 262 formed in the cylinder 240. In the embodiment of the invention illustrated in FIG. 3, the lower piston rod 260 extends axially outward from the cylinder 240. However, if desired, the cylinder 240 may be constructed with an extension which would enclose the lower piston rod 260.

A cylindrical upper piston rod 266 is connected with the piston 176. The upper piston rod 266 is disposed in a coaxial relationship with the piston 176 and the lower piston rod 260. The upper piston rod 266 extends through an opening 268 in the cylinder 240. An annular upper side surface 272 is disposed on the piston 176 and is exposed to the fluid pressure the upper chamber 246.

The upper piston rod 266 has a diameter which is smaller than the diameter of the lower piston rod 260. Therefore, the upper side surface 272 on the piston 176 has a greater area than the lower side surface 256 on the piston 176.

An upper end portion of the upper piston rod 266 is connected with the locking mechanism actuation levers 174 and 182 in the manner illustrated schematically in FIG. 2. Therefore, when the piston 176 is moved between the first or raised position (FIG. 2) and a second lowered position (FIG. 3), the over-center locking mechanism 130 is operated between an engaged or locked condition (FIG. 2) and a disengaged or unlocked condition (FIG. 3).

Figure 3:
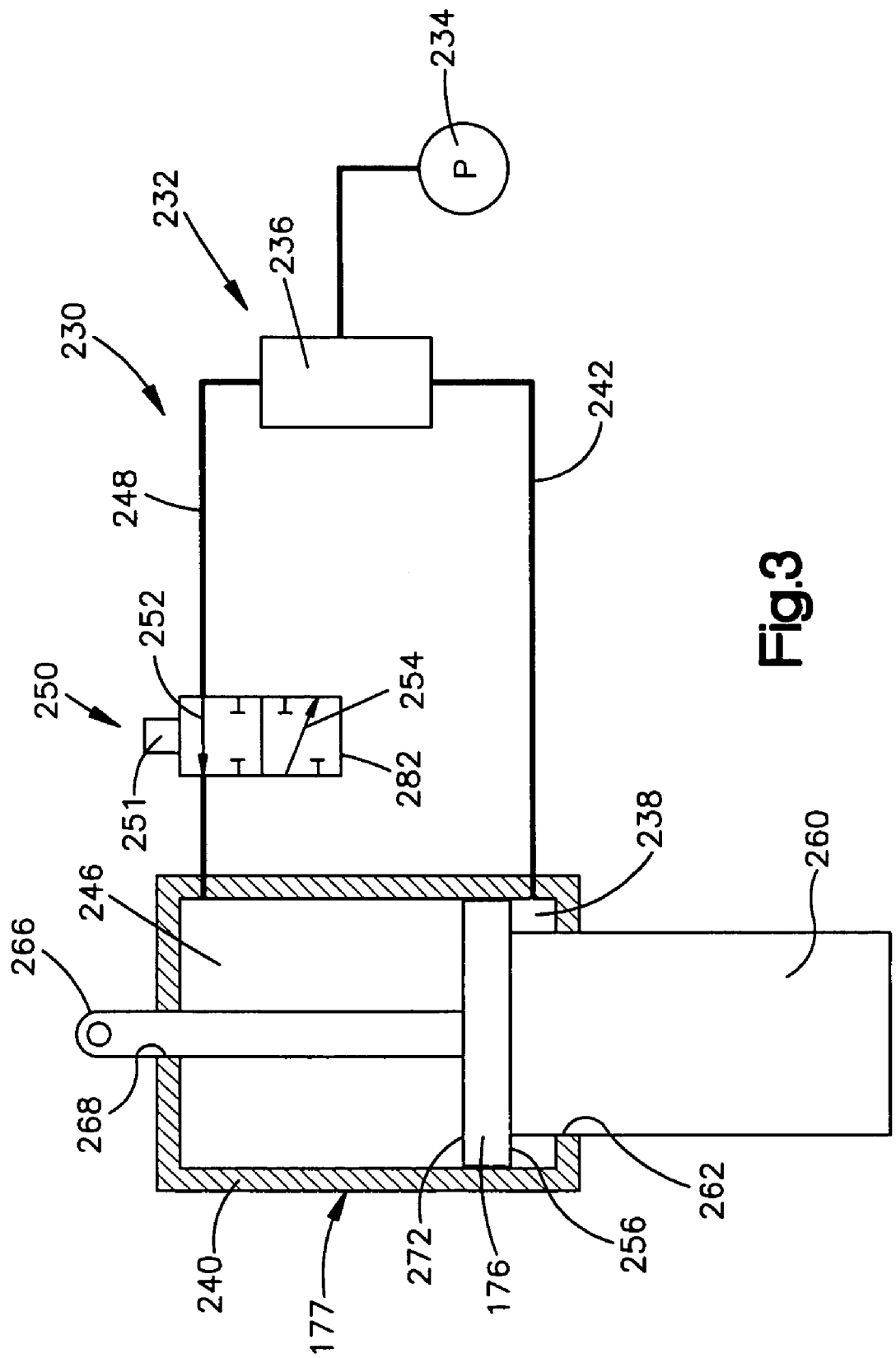
FIG. 3 is a schematic illustration depicting an apparatus which is operable to apply pressure to opposite sides of a piston in the locking mechanism of FIG. 2.

When the piston 176 is in the lowered position of FIG. 3, the locking mechanism 130 is disengaged or unlocked and the steering column 10 is movable relative to the frame of a vehicle. When the piston 176 is in the raised position of FIG. 2, the locking mechanism 130 is engaged or locked and steering column 10 is held against movement relative to the frame of the vehicle. Of course, the steering column member 12 can be rotated relative to the tubular portion 30 (FIG. 1) to turn the steerable vehicle wheels when the locking mechanism 130 is in the engaged condition of FIG. 2.

During operation of a vehicle in which the steering column 10 is disposed, the pump 234 is operated to supply fluid under pressure to the accumulator 236. In the embodiment of the invention illustrated herein, the pump 234 supplies air under pressure to the accumulator 236. However, the control apparatus 230 (FIG. 3) may be constructed so that the pump 234 is effective to supply hydraulic fluid under pressure to the accumulator 236.

The control valve 250 is normally in an unactuated condition in which fluid pressure in the upper chamber 246 in the cylinder 240 is exhausted through the passage 254 in a valve spool 282. When the valve spool 282 is in its unactuated position, fluid flow through the conduit 248 to the upper chamber 246 is blocked by the flow control valve 250.

When the flow control valve 250 is in the unactuated condition venting the upper chamber 246 to atmosphere, the fluid pressure in the lower chamber 238 is effective to move the piston 176 to the first or raised position illustrated in FIG. 2. As the piston 176 moves to the first or raised position illustrated in FIG. 2, the piston rod 266 moves the actuator levers 174 and 182 to the raised position illustrated in FIG. 2. As this occurs, the locking members 132 and 134 are pivoted to apply force against the washers 144 and 158. This force operates the locking mechanism 130 to the locking or engaged condition in which a steering column 10 is held against movement relative to the frame of the vehicle.

As the piston 176 moves toward the first or raised position of FIG. 2, the locking member 132 is pivoted in a counterclockwise direction (as viewed in FIG. 2). This results in the locking member pressing the washer 144 against the plate 46. This force clamps the plates 80 and 82 against the side portion 72 of the mounting bracket 66. Thus, the plates 80 and 82 are clamped between the washers 142 and 144 and are pressed firmly against the side portion 72 of the mounting bracket 66.

Similarly, as the piston 170 moves toward the first or raised position of FIG. 2, the locking member 134 is pivoted in a clockwise direction (as viewed in FIG. 2). This results in the locking member 134 pressing the washer 158 against the plate 86. This force clamps the plates 86 and 88 against the side portion 74 of the mounting bracket 66. Thus, the plates 86 and 88 are clamped between the washers 156 and 158 and are pressed firmly against the side portion 74 of the mounting bracket 66. The construction of the locking members 132 and 134 and the manner in which they effect operation of the locking mechanism 130 to an engaged condition is the same as is described in U.S. Pat. No. 6,666,478.

When the piston 176 is to be moved from the first or raised position of FIG. 2 to the second or lowered position of FIG. 3 to operate the locking mechanism 130 from the engaged condition to the disengaged condition, the control valve 250 is operated to the actuated condition illustrated schematically in FIG. 3. Operating the control valve 250 to the actuated condition illustrated in FIG. 3 results in fluid pressure being conducted from the accumulator 236 through the conduit 248 to the upper chamber 246 in the cylinder 240. At this time, the same fluid pressure is being conducted to both the lower chamber 238 and upper chamber 246 in the cylinder 240.

The area of the upper side surface 272 on the piston 176 is larger than the area of the lower side surface 256 on the piston. Therefore, the fluid pressure in the upper chamber 246 is applied against a greater area on the upper side of the piston 176 than is the fluid pressure in the lower chamber 238. This results in the piston 176 moving downward (as viewed in FIGS. 2 and 3) against the fluid pressure in the chamber 238 even though the fluid pressure in the lower chamber 238 is equal to the fluid pressure in the upper chamber 246. As this happens, fluid flows from the accumulator 236 into the expanding upper chamber 246 through the conduit 248. At the same time, fluid flows from the contracting lower chamber 238 through the conduit 242 back to the accumulator 236.

As the piston 176 is moved downward from the first or raised position (FIG. 2) to the second or lowered position (FIG. 3), the piston rod 266 pulls the actuator levers 174 and 182 (FIG. 2) downward. This results in the locking member 132 being pivoted in a clockwise direction (as viewed in FIG. 2) to interrupt the application of force against the washers 142 and 144. Interruption of the application of force against the washers 142 and 144 releases the plates 80 and 82 for movement relative to the side portion 72 of the mounting bracket 66. Similarly, as the piston 176 moves downward toward the second or lowered position, the locking member 134 is pivoted in a counterclockwise direction (as viewed in FIG. 2) to interrupt the application of force against the washers 156 and 158. This results in the plates 86 and 88 being released for movement relative to the side portion 74 of the mounting bracket 66.

Only a single control valve 250 is required to control the operation of the linear actuator 177. When the control valve 250 is in the actuated condition illustrated in FIG. 3, the same fluid pressure is conducted from the accumulator 236 to the lower and upper chambers 238 and 246 of the linear actuator 177. Since the upper side surface 272 on the piston 176 has a greater area than the lower side surface 256, the fluid pressure against the upper side surface 272 is effective to move the piston 176 downward (as viewed in FIG. 2) to the second or lowered position (FIG. 3) against the influence of fluid pressure in the lower chamber 238. As this occurs, fluid flows from the contracting lower chamber 238 through the conduit 242 to the accumulator 236. The locking mechanism 130 is operated to the disengaged condition as the piston 176 moves downward.

When the piston 176 is to be moved from the second or lowered position (FIG. 3) to a first or raised position (FIG. 2), the valve 250 is operated to its initial or unactuated condition. At this time, the upper chamber 246 in the linear actuator 177 is vented to atmosphere through the valve passage 254. Therefore, the fluid pressure in the lower chamber 238 is effective to move the piston 176 upward toward the first or raised position illustrated in FIG. 2. As this occurs, the locking mechanism 130 is operated to the locking or engaged condition.

From the above description of the invention, those skilled in the art will perceive improvements, changes and modifications. Such improvements, changes and modifications within the skill of the art are intended to be covered by the appended claims.

Having described the invention, the following is claimed:

1. A locking mechanism for a vehicle steering column, said locking mechanism comprising:
   a housing defining a chamber;
   a piston located within said chamber in said housing, said piston being movable between first and second positions relative to said housing, said locking mechanism being in an engaged condition locking the steering column against movement relative to a frame of the vehicle when said piston is in the first position, said locking mechanism being in a disengaged condition in which said locking mechanism is ineffective to lock the steering column against movement relative to the frame of the vehicle when said piston is in the second position;
   a first apparatus which is operable to continuously apply first fluid pressure to a first side of said piston to retain said piston in said first position relative to said housing; and
   a second apparatus which is operable to apply second fluid pressure to a second side of said piston to move said piston from said first position to said second position against the influence of said first fluid pressure.

2. A locking mechanism as set forth in claim 1 wherein said piston has a first surface area on said first side of said piston and a second surface area on said second side of said piston, said second surface area being larger than said first surface area.

3. A locking mechanism as set forth in claim 1 wherein said second apparatus is operable to apply a second pressure which is equal to said first pressure to said second side of said piston.

4. A locking mechanism as set forth in claim 1 wherein said locking mechanism further includes a first member extending from said first side of said piston and a second member extending from said second side of said piston, said first member having a first cross sectional area as viewed in a plane extending perpendicular to a central axis of said first member, said second member having a second cross sectional area as viewed in a plane extending perpendicular to a central axis of said second member, said second cross sectional area being smaller than said first cross sectional area.

5. A locking mechanism for a vehicle steering column, said locking mechanism comprising:
   a housing defining a chamber;
   a piston located within said chamber in said housing, said piston being movable between first and second positions relative to said housing, said locking mechanism being in an engaged condition locking the steering column against movement relative to a frame of the vehicle when said piston is in the first position, said locking mechanism being in a disengaged condition in which said locking mechanism is ineffective to lock the steering column against movement relative to the frame of the vehicle when said piston is in the second position;
   a first apparatus which is operable apply first pressure to a first side of said piston;
   a second apparatus which is operable to apply second pressure to said second side of said piston; and a source of fluid under pressure, said first apparatus includes means for conducting fluid pressure from said source of fluid pressure, said second apparatus includes a valve connected in fluid communication with said source of fluid pressure, said valve being operable between a first condition blocking fluid flow from said source of fluid pressure and a second condition enabling fluid to flow from the source of fluid pressure, said valve being in said second condition during movement of said piston from said first position to said second position.

6. A locking mechanism for a vehicle steering column, said locking mechanism comprising:
   a housing defining a chamber;
   a piston located within said chamber in said housing, said piston being movable between first and second positions relative to said housing, said locking mechanism being in an engaged condition locking the steering column against movement relative to a frame of the vehicle when said piston is in the first position, said locking mechanism being in a disengaged condition in which said locking mechanism is ineffective to lock the steering column against movement relative to the frame of the vehicle when said piston is in the second position;

a first apparatus which is operable to apply first pressure to a first side of said piston;

a second apparatus which is operable to apply second pressure to said second side of said piston; and wherein said piston cooperates with said housing to form first and second chambers, said first side of said piston being exposed to fluid pressure in said first chamber, said second side of said piston being exposed to fluid pressure in said second chamber, said piston being movable from said first position toward said second position under the influence of fluid pressure in said second chamber, said first apparatus being effective to conduct fluid from said first chamber to a source of fluid pressure as said piston moves from said first position toward said second position, said second apparatus being effective to conduct fluid from the source of fluid pressure to said second chamber as said piston moves from said first position toward said second position, said first apparatus being effective to conduct fluid from the source of fluid pressure to said first chamber as said piston moves from said second position toward said first position, said second apparatus being effective to conduct fluid from said second chamber to a location other than the source of fluid pressure as said piston moves from said second position toward said first position.

7. A locking mechanism for a vehicle steering column, said locking mechanism comprising:

a housing defining a chamber;

a piston located within said chamber in said housing, said piston being movable between first and second positions relative to said housing, said locking mechanism being in an engaged condition locking the steering column against movement relative to a frame of the vehicle when said piston is in the first position, said locking mechanism being in a disengaged condition in which said locking mechanism is ineffective to lock the steering column against movement relative to the frame of the vehicle when said piston is in the second position;

a first apparatus which is operable to apply first pressure to a first side of said piston;

a second apparatus which is operable to apply second pressure to said second side of said piston; and wherein said locking mechanism further includes a first rod extending from said first side of said piston into a first opening in said housing and a second rod extending from said second side of said piston into a second opening in said housing, said first rod having a first cross sectional areas as viewed in a plane extending perpendicular to a central axis of said first rod, said second rod having a second cross sectional area as viewed in a plane extending perpendicular to a central axis of said second rod, said second cross sectional area being smaller than said first cross sectional area.

8. A locking mechanism as set forth in claim 7 wherein said first rod has a longitudinal axis that is coaxial with a longitudinal axis of said second rod.

9. A locking mechanism for a vehicle steering column, said locking mechanism comprising:

a housing defining a chamber; a piston located within said chamber in said housing, said piston being movable between first and second positions relative to said housing, said locking mechanism being in an engaged condition locking the steering column against movement relative to a frame of the vehicle when said piston is in the first position, said locking mechanism being in a disengaged condition in which said locking mechanism is ineffective to lock the steering column against movement relative to the frame of the vehicle when said piston is in the second position;

a first apparatus which is operable to apply first pressure to a first side of said piston to retain said piston in said first position relative to said housing; and a second apparatus which is operable to apply second pressure to a second side of said piston to move said piston from said first position to said second position against the influence of said first pressure, said first pressure being equal to said second pressure.

10. A locking mechanism as set forth in claim 9 wherein said piston has a first surface area on said first side of said piston and a second surface area on said second side of said piston, said second surface area being larger than said first surface area.

11. A locking mechanism as set forth in claim 10 wherein said first apparatus is operable to continuously apply said first pressure to said first surface area on said first side of said piston.

12. A locking mechanism as set forth in claim 9 wherein said locking mechanism further includes a first member extending from said first side of said piston and a second member extending from said second side of said piston, said first member having a first cross sectional area as viewed in a plane extending perpendicular to a central axis of said first member, said second member having a second cross sectional area as viewed in a plane extending perpendicular to a central axis of said second member, said second cross sectional area being smaller than said first cross sectional area.

13. A locking mechanism for a vehicle steering column, said locking mechanism comprising:

a housing defining a chamber; a piston located within said chamber in said housing, said piston being movable between first and second positions relative to said housing, said locking mechanism being in an engaged condition locking the steering column against movement relative to a frame of the vehicle when said piston is in the first position, said locking mechanism being in a disengaged condition in which said locking mechanism is ineffective to lock the steering column against movement relative to the frame of the vehicle when said piston is in the second position;

a first apparatus which is operable to apply first pressure to a first side of said piston;

a second apparatus which is operable to apply second pressure to said second side of said piston, said first pressure being equal to said second pressure; and a source of fluid under pressure, said first apparatus includes means for conducting fluid pressure from said source of fluid pressure, said second apparatus includes a valve connected in fluid communication with said source of fluid pressure, said valve being operable between a first condition blocking fluid flow from said source of fluid pressure and a second condition enabling fluid to flow from the source of fluid pressure, said valve being in said second condition during movement of said piston from said first position to said second position.

14. A locking mechanism for a vehicle steering column, said locking mechanism comprising:

a housing defining a chamber; a piston located within said chamber in said housing, said piston being movable between first and second positions relative to said housing, said locking mechanism being in an engaged condition locking the steering column against movement relative to a frame of the vehicle when said piston is in the first position, said locking mechanism being in a disengaged condition in which said locking mechanism is ineffective to lock the steering column against movement relative to the frame of the vehicle when said piston is in the second position;

a first apparatus which is operable to apply first pressure to a first side of said piston;

a second apparatus which is operable to apply second pressure to said second side of said piston, said first pressure being equal to said second pressure; and wherein said piston cooperates with said housing to form first and second chambers, said first side of said piston being exposed to fluid pressure in said first chamber, said second side of said piston being exposed to fluid pressure in said second chamber, said piston being movable from said first position toward said second position under the influence of fluid pressure in said second chamber, said first apparatus being effective to conduct fluid from said first chamber to a source of fluid pressure as said piston moves from said first position toward said second position, said second apparatus being effective to conduct fluid from the source of fluid pressure to said second chamber as said piston moves from said first position toward said second position, said first apparatus being effective to conduct fluid from the source of fluid pressure to said first chamber as said piston moves from said second position toward said first position, said second apparatus being effective to conduct fluid from said second chamber to a location other than the source of fluid pressure as said piston moves from said second position toward said first position.

15. A locking mechanism for a vehicle steering column, said locking mechanism comprising:

a housing defining a chamber; a piston located within said chamber in said housing, said piston being movable between first and second positions relative to said housing, said locking mechanism being in an engaged condition locking the steering column against movement relative to a frame of the vehicle when said piston is in the first position, said locking mechanism being in a disengaged condition in which said locking mechanism is ineffective to lock the steering column against movement relative to the frame of the vehicle when said piston is in the second position;

a first apparatus which is operable to apply first pressure to a first side of said piston;

a second apparatus which is operable to apply second pressure to said second side of said piston, said first pressure being equal to said second pressure; and wherein said locking mechanism further includes a first rod extending from said first side of said piston into a first opening in said housing and a second rod extending from said second side of said piston into a second opening in said housing, said first rod having a first cross sectional areas as viewed in a plane extending perpendicular to a central axis of said first rod, said second rod having a second cross sectional area as viewed in a plane extending perpendicular to a central axis of said second rod, said second cross sectional area being smaller than said first cross sectional area.

16. A locking mechanism as set forth in claim 15 wherein said first rod has a longitudinal axis that is coaxial with a longitudinal axis of said second rod.

\* \* \* \* \*